(12) United States Patent
Noh et al.

(10) Patent No.: US 11,964,877 B2
(45) Date of Patent: Apr. 23, 2024

(54) METHOD FOR PREPARING PEROVSKITE NANOPARTICLE USING FLUIDIC CHANNEL

(71) Applicant: POSTECH Research and Business Development Foundation, Pohang-si (KR)

(72) Inventors: Yongyoung Noh, Daejeon (KR); Youngki Kim, Pohang-si (KR); Jisu Hong, Pohang-si (KR); Hyein Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 230 days.

(21) Appl. No.: 17/373,964

(22) Filed: Jul. 13, 2021

(65) Prior Publication Data

US 2022/0017376 A1 Jan. 20, 2022

(30) Foreign Application Priority Data

Jul. 15, 2020 (KR) .......................... 10-2020-0087530
Jul. 6, 2021 (KR) .......................... 10-2021-0088480

(51) Int. Cl.
*C01D 17/00* (2006.01)
*B01F 23/40* (2022.01)
(Continued)

(52) U.S. Cl.
CPC .......... *C01D 17/003* (2013.01); *B01F 23/451* (2022.01); *B01F 23/49* (2022.01);
(Continued)

(58) Field of Classification Search
CPC ...... C01D 17/003; B01F 23/49; B01F 23/451; B01F 23/48; B01F 25/31; B01F 2025/93;
(Continued)

(56) References Cited

FOREIGN PATENT DOCUMENTS

| CN | 109456764 | 3/2019 |
|---|---|---|
| CN | 110902715 | 3/2020 |

OTHER PUBLICATIONS

Satapathy et al. "Anisotropic Fast Electrically Switchable Emission from Composites of CsPbBr3 Perovskite Quantum Cuboids in a Nematic Liquid Crystal". Advanced Optical Material. 2019, 7, 1801408, p. 1-9. (Year: 2019).*
Kenneth C. K. Cheng et al., "Templated nanofiber synthesis via chemical vapor polymerization into liquid crystalline films", Science 362, 804-808, Nov. 16, 2018.
Javad Shamsi et al., "Metal Halide Perovskite Nanocrystals: Synthesis, Post-Synthesis Modifications, and Their Optical Properties", Chem. Rev. 2019, 119, 3296-3348, Feb. 13, 2019, DOI: 10.1021/acs.chemrev.8b00644.

(Continued)

*Primary Examiner* — Coris Fung
*Assistant Examiner* — Catriona M Corallo
(74) *Attorney, Agent, or Firm* — LEX IP MEISTER, PLLC (57) ABSTRACT

Disclosed is a method for preparing a perovskite nanoparticle using a fluidic channel including a first step of forming a fluidic channel including a first outer tube, a second outer tube, and a storage tube capable of introducing flows of fluids, a second step of inducing formation of the perovskite nanoparticles by continuously preparing a mixed fluid with a laminar flow based on a flow rate by introducing a flow of a base fluid into the first outer tube, and introducing a flow of a dispersion fluid in the same direction as the flow of the base fluid into the second outer tube, and a third step of separating the perovskite nanoparticles from the mixed fluid stored in the storage tube.

10 Claims, 5 Drawing Sheets

(51) Int. Cl.
  *B01F 23/451*  (2022.01)
  *B01F 25/31*   (2022.01)
  *B01F 25/00*   (2022.01)
  *B82Y 40/00*   (2011.01)

(52) U.S. Cl.
  CPC .............. *B01F 25/31* (2022.01); *B01F 23/48* (2022.01); *B01F 2025/93* (2022.01); *B82Y 40/00* (2013.01); *C01P 2002/34* (2013.01); *C01P 2004/03* (2013.01); *C01P 2004/64* (2013.01); *C01P 2006/60* (2013.01)

(58) Field of Classification Search
  CPC .. B82Y 40/00; C01P 2002/34; C01P 2004/03; C01P 2004/64; C01P 2006/60
  See application file for complete search history.

(56) References Cited

OTHER PUBLICATIONS

Hailong Huang et al., "Emulsion Synthesis of Size-Tunable CH3NH3PbBr3 Quantum Dots: An Alternative Route toward Efficient Light-Emitting Diodes", ACS Appl. Mater. Interfaces 2015, 7, 28128-28133, Dec. 12, 2015.

Feng Zhang et al., "Brightly Luminescent and Color-Tunable Colloidal CH3NH3PbX3 (X = Br, I, Ci) Quantum Dots: Potential Alternatives for Display Technology", ACS Nano 2015, 9, 4, 4533-4542, Mar. 30, 2015.

Anupam Sengupta et al., "Topological microfluidics for flexible micro-cargo concepts", Soft Matter, 2013, 9, 7251-7260, May 21, 2013.

* cited by examiner

METHOD FOR PREPARING PEROVSKITE NANOPARTICLE USING FLUIDIC CHANNEL

CROSS-REFERENCE TO RELATED APPLICATIONS

A claim for priority under 35 U.S.C. § 119 is made to Korean Patent Application Nos. 10-2020-0087530 filed on Jul. 15, 2020, and 10-2021-0088480 filed on Jul. 6, 2021, in the Korean Intellectual Property Office, the entire contents of which are hereby incorporated by reference.

STATEMENT REGARDING GOVERNMENT SUPPORT

This invention was supported at least in part by ministry of Science and ICT of South Korean government for research project, the title of which is "Low-dimensional perovskite materials and opto-electric device laboratory" (Project Number: 2020R1A4A1019455) managed by NFR (National Research Foundation of Korea).

Also, this invention was supported at least in part by ministry of Science and ICT of South Korean government for research project, the title of which is "Synthesis of Perovskite Nanowires using Mesogenic Soft Template" (Project Number: 2020R1F1A1066377) managed by NFR (National Research Foundation of Korea).

Also, this invention was supported at least in part by ministry of Science and ICT of South Korean government for research project, the title of which is "Synthesis of Perovskite Nano-Crystal via Microfluidic System based on Mesogenic Fluids" (Project Number: 2021R1A2C2095010) managed by NFR (National Research Foundation of Korea).

Also, this invention was supported at least in part by ministry of Science and ICT of South Korean government for research project, the Project Number of which is "RS-2023-00212739" managed by NFR (National Research Foundation of Korea).

BACKGROUND

Embodiments of the inventive concept described herein relate to a method for preparing a perovskite nanoparticle using a fluidic channel.

Halide perovskite is a material with a crystal structure of $ABX_3$, and A and B are cations, and X is an anion. Specifically, the halide perovskite may include organic-inorganic composite perovskite or inorganic perovskite having a three-dimensional structure having an organic cation or an inorganic cation as A, an inorganic cation as B, and a halogen anion as X.

Such halide perovskite has excellent light emission characteristics and light absorption characteristics, so that such halide perovskite is well known as a semiconductor material applied as an active layer material for a light-emitting diode (LED), a solar cell, and the like. By replacing a halide material, a specific emission wavelength that falls within a 400 to 750 nm range, which is a visible light region, may be selected, so that red, green, and blue light emitting devices of a display may be implemented.

In addition, because the halide perovskite material itself has a low exciton binding energy, it is advantageous to increase the exciton binding energy to maintain the light emission characteristics at a high level. This may be achieved by synthesizing a low-dimensional perovskite quantum dot to have a quantum confinement effect.

In one example, the perovskite quantum dot having the quantum confinement effect is able to adjust the emission wavelength by adjusting a size of the quantum dot, and is advantageous as the light emitting device of the display because of a high color purity thereof. However, a synthesis method capable of synthesizing perovskite quantum dots whose size may be precisely controlled, having excellent crystallinity and uniform size distribution at low cost should be developed to use the above-described perovskite quantum dot for a next-generation display.

A ligand assisted reprecipitation method, which is one of various methods for synthesizing the perovskite quantum dot currently reported, is a method capable of easily synthesizing the perovskite quantum dot by mixing a perovskite precursor and a solvent with each other in a solution at a room temperature. Although there are advantages of excellent dispersibility and high photoluminescence quantum efficiency of the synthesized quantum dots, aggregation occurs in a crystal growth process of the perovskite, which causes a low synthesis yield of the quantum dot, it is difficult to adjust the size of the quantum dot and to obtain the quantum dots of the uniform size distribution, and it is difficult to perform subsequent clean and refinement of the quantum dot after the synthesis. Thus, the ligand assisted reprecipitation method is not suitable for mass production.

In addition, in a case of a solution-based high-temperature injection method that is currently commercialized and used, perovskite crystals of relatively uniform size may be synthesized compared to the ligand assisted reprecipitation method, but an additional filter process is still required to select a quantum dot having a small half-width of a desired wavelength, and a high temperature process is included, so that the solution-based high-temperature injection method is not suitable for mass production.

That is, perovskite crystals synthesized with the above synthesis methods are not uniform in the size as well as the crystallinity, which causes deterioration of light emission characteristics and stability.

Accordingly, development of a new synthetic system that may synthesize the quantum dots with the uniform size distribution and the excellent crystallinity with a high synthesis yield while maintaining the easy synthesis advantage of the ligand assisted reprecipitation method, may easily control the size of the quantum dot, and may easily perform a purification process is required for mass production of the perovskite quantum dot with the excellent light emission characteristics.

SUMMARY

Embodiments of the inventive concept provide a method for preparing a perovskite nanoparticle using a fluidic channel that may increase a production yield while preventing excessive nanoparticle growth and aggregation during a growth process of the perovskite nanoparticle.

In addition, embodiments of the inventive concept provide a method for preparing a perovskite nanoparticle using a fluidic channel in which size adjustment of perovskite nanoparticles is easy, and the perovskite nanoparticles have a narrow size distribution, and have a small light emission half-width and a high light emission quantum efficiency by excellent crystallinity thereof.

According to an exemplary embodiment, a method for preparing a perovskite nanoparticle using a fluidic channel including a first outer tube with both sides open, a second outer tube disposed on one side of the first outer tube, and a storage tube disposed on the other side of the first outer tube includes a first step of forming the fluidic channel including the first outer tube, the second outer tube, and the storage tube capable of introducing flows of fluids, a second step of inducing formation of the perovskite nanoparticles by continuously preparing a mixed fluid with a laminar flow based on a flow rate by introducing a flow of a base fluid into the first outer tube, and introducing a flow of a dispersion fluid in the same direction as the flow of the base fluid into the second outer tube, and a third step of separating the perovskite nanoparticles from the mixed fluid stored in the storage tube.

In addition, the dispersion fluid may contain a perovskite precursor, an organic ligand, and a polar aprotic solvent, and the base fluid may contain a liquid crystal.

In addition, the method may further include, before the second step, a step of preparing the dispersion fluid, wherein the step of preparing the dispersion fluid includes preparing a perovskite precursor solution containing a first compound satisfying a following Chemical Formula 1, a second compound satisfying a following Chemical Formula 2, and the polar aprotic solvent, and mixing the organic ligand with the perovskite precursor solution. [Chemical Formula 1] AX (In Chemical Formula 1, A is $Cs^+$ or an organic cation; X is $Br^-$, $Cl^-$, or $I^-$.) [Chemical Formula 2] $BX_2$ (In Chemical Formula 2, B is $Pb^{2+}$, $Sn^{2+}$, $Bi^{2+}$, $Sb^{2+}$, $Mn^{2+}$, or $Cu^{2+}$; X is $Br^-$, $Cl^-$, or $I^-$.)

In addition, the step of preparing the perovskite precursor solution may include mixing the first compound and the second compound with each other in a molar ratio of 1:0.75 to 1.5.

In addition, the organic cation may be at least one cation selected from a group consisting of a methylammonium cation, a formamidinium cation, and a phenylethylammonium cation.

In addition, the polar aprotic solvent may be at least one selected from a group consisting of dimethylformamide and dimethyl sulfoxide.

In addition, the organic ligand may include $R^1COOH$ and $R^2NH_2$, $R^1$ and $R^2$ may be a saturated alkyl group or an unsaturated alkyl group having 6 to 28 carbon atoms, regardless of each other, the $R^1COOH$ may be oleic acid, and the $R^2NH_2$ may be oleylamine or octylamine.

In addition, the step of mixing the organic ligand with the perovskite precursor solution may include controlling a size of the perovskite nanoparticle by adjusting a crystallization reaction speed based on an amount of $R^2NH_2$ to be mixed.

In addition, the second step may include limiting a particle growth of the perovskite nanoparticle by an elastic force of the base fluid occurring when the perovskite nanoparticle becomes larger than a characteristic region (an extrapolation length) defined by an elastic constant and a surface anchoring coefficient of the base fluid contained in the mixed fluid.

In addition, the size of the perovskite nanoparticle may be controlled by controlling a magnitude of the characteristic region, and the magnitude of the characteristic region may be controlled by changing a flow rate of one selected from the base fluid and the dispersion fluid constituting the mixed fluid, or by applying a stimulus of one selected from a temperature, an electric field, and a magnetic field to the mixed fluid.

In addition, the magnitude of the characteristic region may be controlled based on a temperature of a phase transition from an aligned state to a disordered state and a molecular mass of the base fluid contained in the mixed fluid.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 2 is a view for illustrating a process in which a perovskite nanoparticle is formed in a method for preparing the perovskite nanoparticle using a fluidic channel according to an embodiment of the inventive concept;

FIG. 3 is an image of a fluidic channel observed with a fluorescence microscope according to an embodiment of the inventive concept;

FIG. 4 is an image showing light emission characteristics of a perovskite nanoparticle dispersion according to an embodiment of the inventive concept;

FIG. 5 is an image obtained by observing a size of a perovskite nanoparticle according to an embodiment of the inventive concept;

DETAILED DESCRIPTION

Hereinafter, specific embodiments of the inventive concept will be described in detail with reference to the drawings attached hereto.

In addition, in describing the inventive concept, when it is determined that a detailed description of a related known component or function may obscure the gist of the inventive concept, the detailed description thereof will be omitted.

Embodiments of the inventive concept are provided to more fully describe the inventive concept to those of ordinary skill in the art. The following embodiment may be transformed into several different forms. The scope of the inventive concept is not limited to the following embodiment.

Rather, such embodiments are provided so as to make the present disclosure more thorough and complete, and to fully convey the spirit of the inventive concept to those skilled in the art.

In addition, in the following drawings, each component is exaggerated for convenience and clarity of description, and the same reference numerals in the drawings refer to the same elements. As used herein, the term "and/or" includes one or all combinations of one or more of those listed items.

The terminology used herein is for the purpose of describing specific embodiments only and is not intended to be limiting of the inventive concept.

As used herein, the singular forms 'a' and 'an' are intended to include the plural forms as well, unless the context clearly indicates otherwise. Also, as used herein, "comprise" and/or "comprising" refers to the presence of the recited shapes, numbers, steps, operations, members, elements, and/or groups thereof.

It does not exclude the presence or addition of one or more other shapes, numbers, operations, members, elements, and/or groups.

Figure 1:
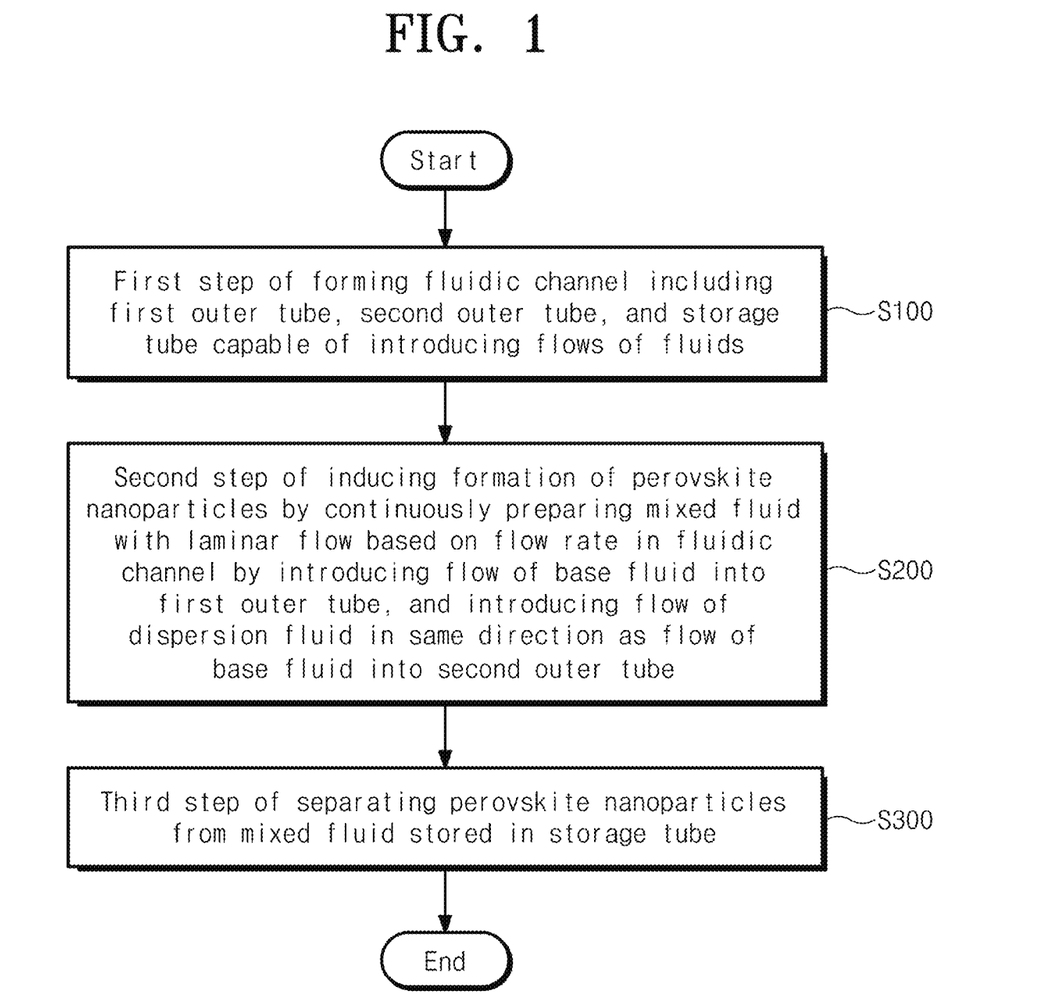
FIG. 1 is a flowchart sequentially illustrating a method for preparing a perovskite nanoparticle using a fluidic channel according to an embodiment of the inventive concept.

FIG. 1 is a flowchart sequentially illustrating a method for preparing a perovskite nanoparticle using a fluidic channel according to an embodiment of the inventive concept, and FIG. 2 is a view for illustrating a process in which a perovskite nanoparticle is formed in a method for preparing the perovskite nanoparticle using a fluidic channel according to an embodiment of the inventive concept.

Referring to FIGS. 1 to 2, a method for preparing a perovskite nanoparticle using a fluidic channel according to an embodiment of the inventive concept, which is a method for preparing a perovskite nanoparticle using a fluidic channel 10 including a first outer tube 1 having a shape in which both sides thereof are open, a second outer tube 2 disposed on one side of the outer tube 1, and a storage tube 3 disposed on the other side of the outer tube 1, includes first step (S100) of forming a fluidic channel including the first outer tube 1, the second outer tube 2, and the storage tube 3 capable of introducing flows of fluids, second step (S200) of inducing formation of the perovskite nanoparticles by continuously preparing a mixed fluid with a laminar flow based on a flow rate in the fluidic channel 10 by introducing a flow of a base fluid into the first outer tube 1, and introducing a flow of a dispersion fluid in the same direction as the flow of the base fluid into the second outer tube 2, and third step (S300) of separating the perovskite nanoparticles from the mixed fluid stored in the storage tube 3.

Figure 2A:
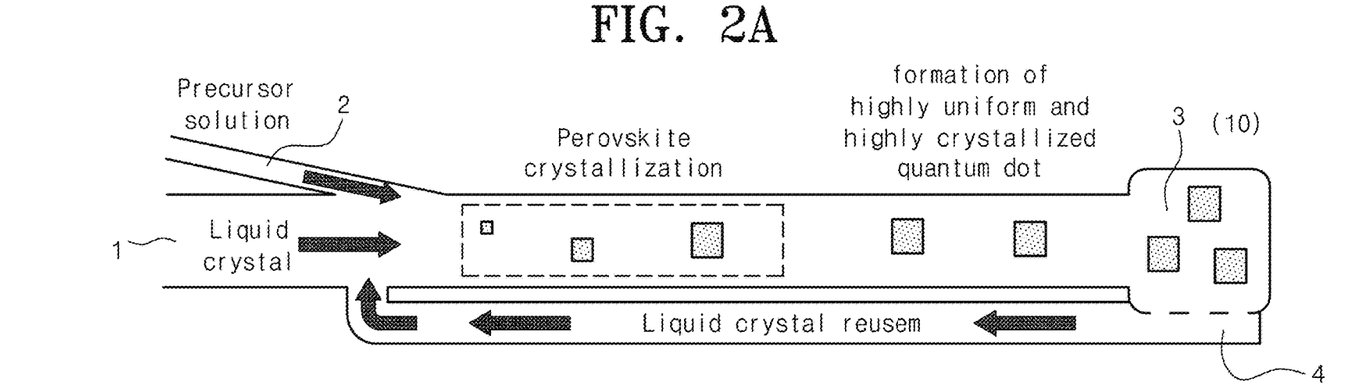
FIG. 2A is a view showing the formation of the perovskite nanoparticles using the fluidic channel.
Figure 2B:
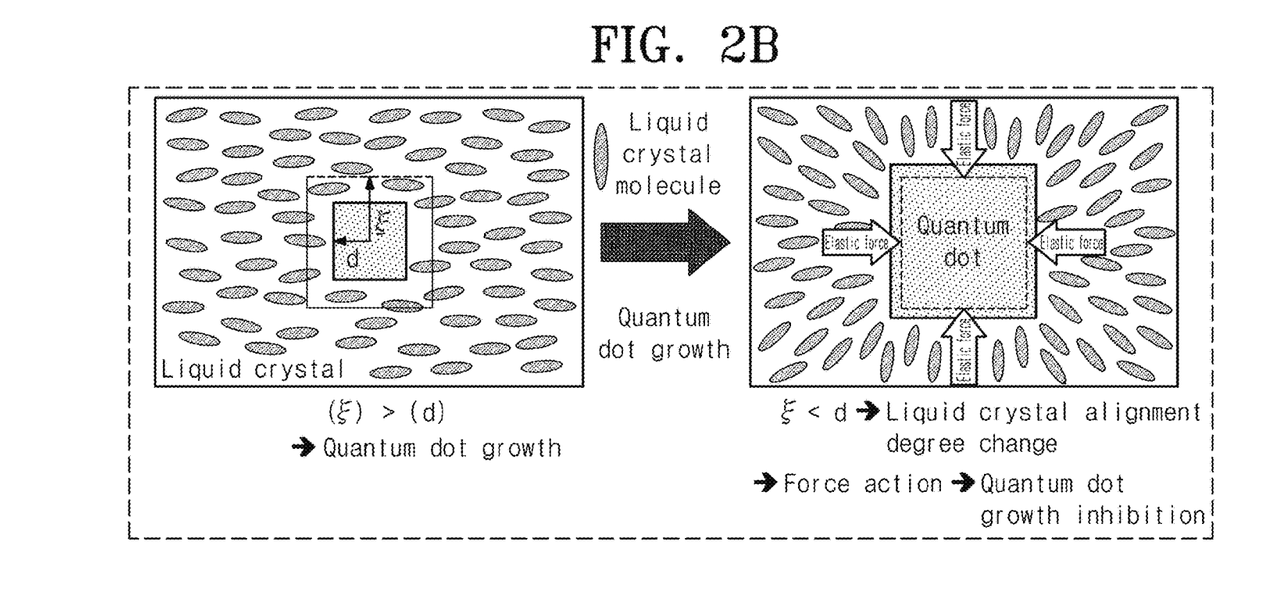
FIG. 2B is a view showing an elastic force of the base fluid applied to the nanocrystal particles based on a change in a size of the perovskite nanoparticles.

In addition, each step may be illustrated as in FIGS. 2A and 2B. FIG. 2A is a view showing the formation of the perovskite nanoparticles using the fluidic channel, and FIG. 2B is a view showing an elastic force of the base fluid applied to the nanocrystal particles based on a change in a size of the perovskite nanoparticles.

Hereinafter, each step of the method for preparing the perovskite nanoparticle using the fluidic channel according to an embodiment of the inventive concept will be described in detail.

First, in first step (S100), the fluidic channel 10 may be composed of the first outer tube 1, the second outer tube 2, and the storage tube 3, and a size of an inner diameter increases in an order from the second outer tube 2, the first outer tube 1, and the storage tube 3.

The first outer tube 1 has the shape in which the both sides are open, the second outer tube 2 is disposed on one side of the first outer tube 1, and the storage tube 3 is disposed on the other side of the first outer tube 1. In this connection, the tubes are connected to each other in a state of being separated from an external fluid supply (not shown), so that the fluids may be introduced without mixing with each other. In this connection, the base fluid is introduced into the first outer tube 1, and the dispersion fluid is introduced into the second outer tube 2.

Specifically, in the fluidic channel 10, the second outer tube 2 may be disposed at a front end of the first outer tube 1, the storage tube 3 may be disposed at a rear end of the first outer tube 1. The fluidic channel 10 further includes a circulation tube 4 that connects the storage tube 3 with the front end of the first outer tube 1. Accordingly, the base fluid may be recirculated in an inner space of the fluidic channel 10.

In addition, the storage tube 3 may provide a storage space for storing therein the mixed fluid having the laminar flow based on the flow rate along the fluidic channel 10, and a separate stirring apparatus (not shown) may be further disposed in the storage space.

Next, the method for preparing the perovskite nanoparticle using the fluidic channel according to an embodiment of the inventive concept further includes step (S150) of preparing the dispersion fluid before second step (S200).

Step (S150) may include step (S151) of preparing a perovskite precursor solution containing a first compound satisfying a following Chemical Formula 1, a second compound satisfying a following Chemical Formula 2, and a polar aprotic solvent, and step (S152) of mixing an organic ligand with the perovskite precursor solution.

In step (S151), the first compound and the second compound according to an embodiment of the inventive concept satisfy Chemical Formula 1 and Chemical Formula 2 below, respectively.

$$AX \quad \text{[Chemical Formula 1]}$$

In Chemical Formula 1, A is $Cs^+$ or an organic cation; X is $Br^-$, $Cl^-$, or $I^-$.

Preferably, A may be the organic cation. Specifically, the organic cation is at least one selected from a group consisting of a methylammonium cation, a formamidinium cation, and a phenylethylammonium cation.

$$BX_2 \quad \text{[Chemical Formula 2]}$$

In Chemical Formula 2, B is $Pb^{2+}$, $Sn^{2+}$, $Bi^{2+}$, $Sb^{2+}$, $Mn^{2+}$, or $Cu^{2+}$; X is $Br^-$, $Cl^-$, or $I^-$.

In addition, in step (S151), the perovskite precursor solution is prepared by evenly mixing the first compound and the second compound in the polar aprotic solvent and then ionizing the mixture. In this connection, the first compound and the second compound may be mixed in a molar ratio of 1:075 to 1.5.

In addition, in step (S151), the polar aprotic solvent may be at least one selected from a group consisting of dimethylformamide (N,N-dimethylformamide) and dimethyl sulfoxide.

In step (S152), the organic ligand includes $R^1COOH$ and $R^2NH_2$, and $R^1$ and $R^2$ may be a saturated alkyl group or an unsaturated alkyl group having 6 to 28 carbon atoms regardless of each other. For example, $R^1$ and $R^2$ may be an unsaturated linear alkyl group having at least one double bond having 12 to 20 carbon atoms.

Specifically, the $R^1COOH$ is oleic acid, and the $R^2NH_2$ is oleylamine or octylamine.

In addition, an amount of organic ligand to be mixed may determine a size of the perovskite nanoparticle. Specifically, in step (S152), a crystallization reaction speed is adjusted based on an amount of $R^2NH_2$ to be mixed, so that the size of the perovskite nanoparticle may be controlled. In this connection, the crystallization means crystallization of the perovskite precursor into a perovskite crystal nucleus.

For example, in step (S152), as an amount of $R^2NH_2$ contained in the dispersion fluid increases, the size of the perovskite nanoparticle may decrease, and as the amount of $R^2NH_2$ contained in the dispersion fluid decreases, the size of the perovskite nanoparticles may increase.

Next, in second step (S200), the base fluid contains a liquid crystal. The base fluid may be introduced into the first outer tube 1 and flow in a direction from the front end to the rear end of the first outer tube 1, and recirculate along the inner space of the fluidic channel 10 through the circulation tube.

In addition, the dispersion fluid contains the perovskite precursor solution and the organic ligand, and the dispersion fluid is introduced into the first outer tube 1 through the second outer tube 2.

Accordingly, in step (S200), when the dispersion fluid is introduced into the first outer tube 1, the mixed fluid having the laminar flow based on the flow rate may be continuously prepared.

In addition, in step (S200), because of the polar aprotic solvent contained in the dispersion fluid, the base fluid and the dispersion fluid may be mixed with each other. At an interface where the base fluid and the dispersion fluid start to be mixed with each other, the crystallization of the perovskite precursor into the perovskite crystal nucleus may occur. That is, the perovskite crystal nucleus is formed at the interface between the dispersion fluid and the base fluid introduced to have predetermined flow rates, respectively.

Specifically, in step (S200), the perovskite precursor is crystallized into the perovskite crystal nucleus by a difference in solubility between the base fluid and the dispersion fluid in the mixed fluid with the laminar flow based on the flow rate, and the crystallized perovskite crystal nucleus grows to a limited size by an elastic force of the base fluid contained in the mixed fluid to form the perovskite nanoparticle.

In this connection, the particle growth of the perovskite nanoparticle may be limited by the elastic force of the base fluid, which occurs when the perovskite nanoparticle becomes larger than a characteristic region (an extrapolation length) defined by an elastic constant and a surface anchoring coefficient of the base fluid contained in the mixed fluid.

In this connection, it is preferable that, in order to have the elastic force, the base fluid uses a liquid crystal having a wide liquid crystal phase range such that the base fluid may maintain a liquid crystal phase when the dispersion fluid is introduced into the base fluid at a predetermined flow rate.

Accordingly, step (S200) may induce the formation of the perovskite nanoparticle as the mixed fluid with the laminar flow based on the flow rate is continuously formed.

Next, in third step (S300), the mixed fluid containing the perovskite nanoparticle formed in step (S200) is stored in the storage tube 3, and the base fluid and an unreacted perovskite precursor are removed from the mixed fluid stored in the storage tube 3 to separate the perovskite nanoparticle.

In the method for preparing the perovskite nanoparticle using the fluidic channel according to an embodiment of the inventive concept, step (S300) may further include step (S310) of stirring the mixed fluid stored in the storage tube 3 for 1 to 3 hours.

In step (S310), as the mixed fluid stored in the storage tube 3 is stirred, the formation of the perovskite nanoparticle may be induced. Specifically, when the mixed fluid having the laminar flow based on the flow rate flows to the storage tube 3 disposed at the end of the first outer tube 1 and stored in the storage tube 3 in step (200), the stirring process of the mixed fluid may induce a particle growth of a less grown perovskite nucleus, thereby allowing a formation of additional perovskite nanoparticles.

That is, in the stirring process in step (S310), a plurality of crystallized perovskite crystal nuclei grow through a nucleation process to form the perovskite nanoparticles. The particle growth of the perovskite nanoparticle may be limited by the elastic force of the base fluid, which occurs when the perovskite nanoparticle becomes larger than the characteristic region (the extrapolation length) defined by the elastic constant and the surface anchoring coefficient of the base fluid contained in the mixed fluid.

Accordingly, in step (S200) and step (S310) of the inventive concept, the mixed fluid contains the liquid crystal that is a base fluid having a specific elastic constant and a specific surface anchoring coefficient, so that, when the perovskite nanoparticle grows more than the characteristic region defined by the base fluid contained in the mixed fluid, a change in an orientation of liquid crystal molecules in the liquid crystal is induced, and the elastic force of the liquid crystal molecules desired to return to an original state thereof limits the particle growth of the perovskite nanoparticle.

In one embodiment of the inventive concept, the perovskite nanoparticle is able to grow to be in a state in which a growth force of the perovskite nanoparticle and the elastic force of the base fluid are in equilibrium. Preferably, the perovskite nanoparticle may have a size of 2 to 300 nm.

In this connection, the formed perovskite nanoparticle may be used as a quantum dot, which is a semiconductor nanoparticle that falls within a range of a quantum confinement effect.

The base fluid may be at least one selected from a group consisting of a nematic liquid crystal, a smectic liquid crystal, a cholesteric liquid crystal, and a lyotropic liquid crystal. Any liquid crystal having a liquid crystal phase within a specific temperature range may be used without limitation. Preferably, a liquid crystal having a wide temperature range for having the liquid crystal phase may be used.

In the method for preparing the perovskite nanoparticle using the fluidic channel according to an embodiment of the inventive concept, the size of the perovskite nanoparticle may be controlled by controlling a size of the characteristic region in various manners.

Specifically, the size of the perovskite nanoparticle is proportional to a magnitude of the characteristic region. Using such characteristics, in second step (S200), the magnitude of the characteristic region may be controlled by changing the flow rate of one selected from the base fluid and the dispersion fluid constituting the mixed fluid with the laminar flow based on the flow rate, or by applying a stimulus of one selected from a temperature, an electric field, and a magnetic field to the mixed fluid. In this connection, the changing of the flow rate of the fluid means changing of the flow rate of the base fluid while fixing the flow rate of the dispersion fluid, or changing of the flow rate of the dispersion fluid while fixing the flow rate of the base fluid.

Specifically, the changing of the fluid flow rate of one of the base fluid and the dispersion fluid and the stimulation of one of the temperature, the electric field, and the magnetic field applied to the mixed fluid may change an alignment degree of the liquid crystal molecules. For example, as the flow rate of the dispersion fluid is increased in a state where the flow rate of the base fluid is fixed, the alignment degree of the liquid crystal molecules decreases to increase the magnitude of the characteristic region, so that the size of the perovskite nanoparticle may be increased.

In addition, the magnitude of the characteristic region may be controlled based on a temperature of a phase transition from an aligned state to a disordered state and a molecular mass of the base fluid contained in the mixed fluid. The size of the perovskite nanoparticle formed using the fluidic channel according to an embodiment of the inventive concept may have a size of 2 to 300 nm.

Again, referring to FIG. 2B, the perovskite precursor under a preset condition is crystallized into the perovskite crystal nucleus in the mixed fluid with the laminar flow based on to the flow rate, and the perovskite crystal nucleus grows to form the perovskite nanoparticle. The growth of the perovskite nanoparticle may be continued until the particle growth is stopped by the elastic force induced when the perovskite nanoparticle becomes larger than the characteristic region defined by the base fluid contained in the mixed fluid. The perovskite nanoparticle grows to the characteristic region, which is a region indicated by a dotted line in FIG. 2B. In this connection, a radius d of the perovskite nanoparticle is almost equal to a radius of the characteristic region, which is the region indicated by the dotted line, defined by the base fluid.

Hereinafter, a following preferred example will be presented to help the understanding of the inventive concept. However, the following example is only provided to make the inventive concept to be more easily understood, and the content of the inventive concept is not limited by the embodiment, and various other modifications and changes are possible.

<Example 1> Preparation of Perovskite Nanoparticle Dispersion

A mixed solution was prepared by dissolving 0.16 mmol of a CsBr precursor and 0.20 mmol of a $PbBr_2$ precursor in 5 ml of a dimethylformamide solvent. The dispersion fluid containing the perovskite precursor solution and the organic ligand was prepared by sequentially adding the oleic acid, which is $R^1COOH$, and the octylamine, which is $R^2NH_2$, into the prepared mixed solution and stirring the mixed solution. In this connection, the oleic acid and the octrylamine were mixed with each other in a volume ratio of 1:0.04.

Thereafter, the fluidic channel including the first outer tube 1, the second outer tube 2, and the storage tube 3 was prepared, the prepared dispersion fluid was introduced into the outer tube 2 of the fluidic channel, and the base fluid made of the liquid crystal was introduced into the outer tube 1 of the fluidic channel. In this connection, HPC was used as the liquid crystal.

In addition, to identify characteristics of the perovskite nanoparticle based on the flow rate, the dispersion fluid was introduced while increasing the flow rate thereof, and the liquid crystal was introduced while fixing a flow rate of the liquid crystal at 1000 μl/hr such that directions of flows of the dispersion fluid and the liquid crystal are the same.

Thereafter, the mixed fluid containing the perovskite crystal nucleus and the perovskite nanoparticles was stored in the storage tube 3 and stirred at a stirring temperature of 25° C. for 2 hours.

Next, the perovskite nanoparticles were separated by removing a material except for the perovskite nanoparticles from the stirred mixed fluid, and the separated perovskite nanoparticles were redispersed in toluene solvent to prepare samples X1 to X3, which are perovskite nanoparticle dispersions.

In addition, each sample will be described. A sample X1 is a perovskite nanoparticle dispersion with the flow rate of the dispersion fluid of 80 μl/hr, a sample X2 is a perovskite nanoparticle dispersion with the flow rate of the dispersion fluid of 130 μl/hr, and a sample X3 is a perovskite nanoparticle dispersion with the flow rate of the dispersion fluid of 200 μl/hr.

<Experimental Example 1> Fluorescence Microscope Analysis

To identify the perovskite nanoparticle formation of the method for preparing the perovskite nanoparticle using the fluidic channel according to an embodiment of the inventive concept, the fluidic channel of Example 1 was analyzed with a fluorescence microscope, and a result thereof is shown in FIG. 3.

FIG. 3 is an image of a fluidic channel observed with a fluorescence microscope according to an embodiment of the inventive concept.

Figure 3A:
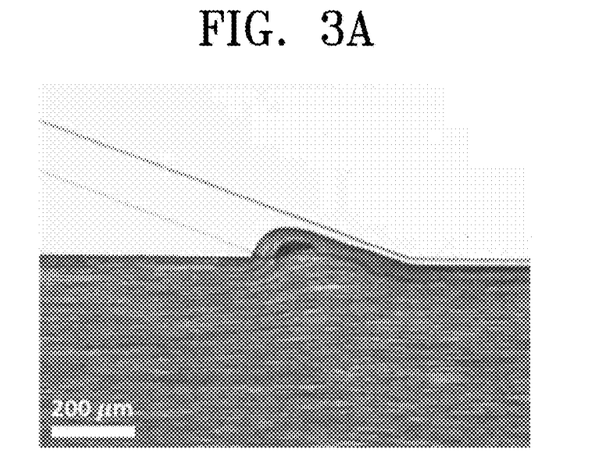
FIG. 3A is an image of the fluidic channel observed using a visible ray region filter.
Figure 3B:
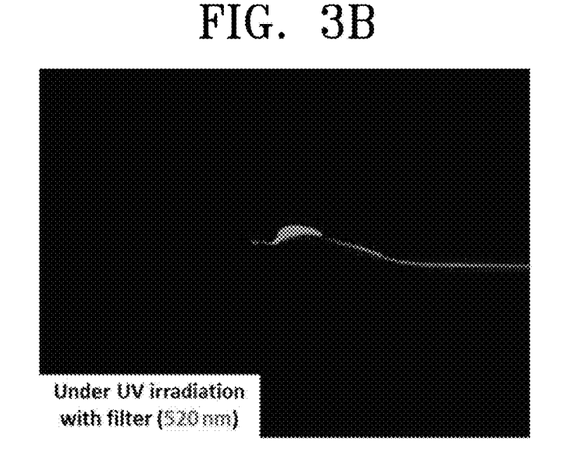
FIG. 3B is an image of the fluidic channel observed using a 520 nm wavelength filter.
Figure 3C:
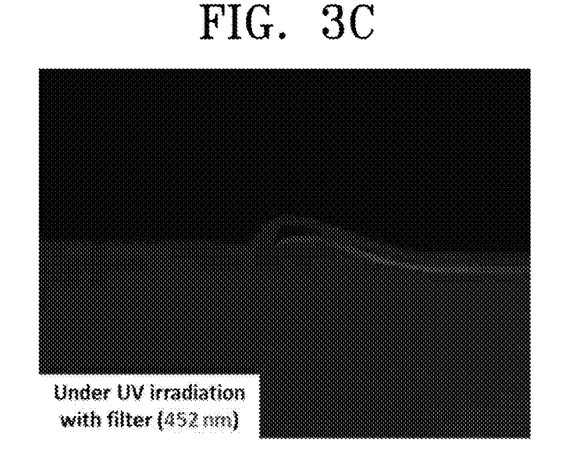
FIG. 3C is an image of the fluidic channel observed using a 452 nm wavelength filter.

FIG. 3A is an image of the fluidic channel observed using a visible ray region filter, FIG. 3B is an image of the fluidic channel observed using a 520 nm wavelength filter, and FIG. 3C is an image of the fluidic channel observed using a 452 nm wavelength filter.

As shown in FIG. 3A, the mixed fluid with the laminar flow based on the flow rate continuously prepared in the fluidic channel may be identified. In FIGS. 3B and 3C, a location where the perovskite nanoparticle is formed and the flow of the liquid crystal in the mixed fluid with the laminar flow based on the flow rate are identified.

<Experimental Example 2> Light Emission Wavelength Analysis

To observe light emission characteristics of the perovskite nanoparticle dispersion prepared with the method for preparing the perovskite nanoparticle using the fluidic channel according to an embodiment of the inventive concept, emission wavelengths of the samples X1 to X3 in Example 1 were analyzed, and a result thereof is shown in FIG. 4.

FIG. 4 is an image showing light emission characteristics of a perovskite nanoparticle dispersion according to an embodiment of the inventive concept.

Figure 4A:
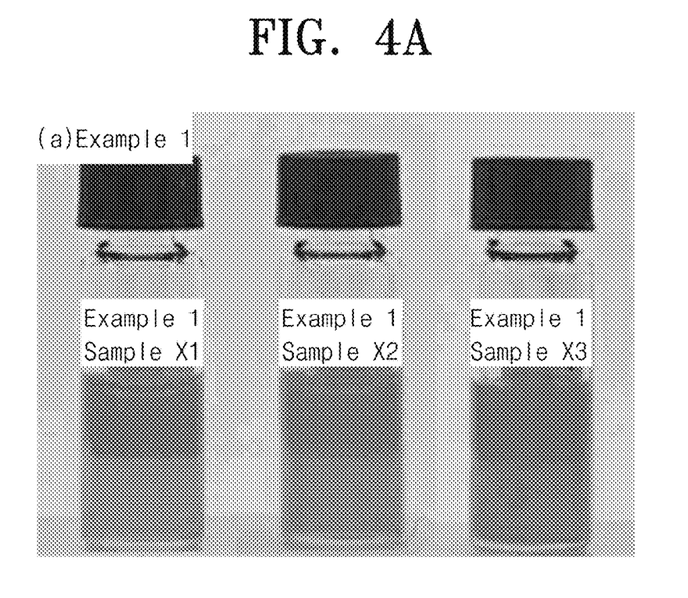
FIGS. 4A and 4B are a photo and a light emission characteristics graph of the perovskite nanoparticle dispersions prepared based on the samples X1 to X3.
Figure 4B:
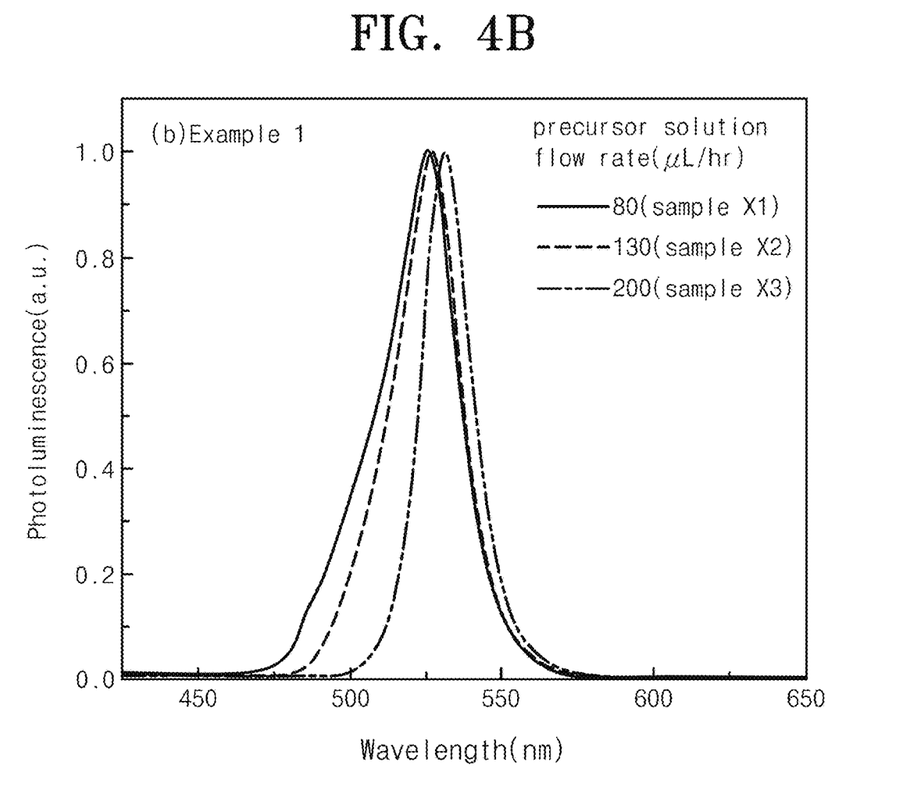

FIGS. 4A and 4B are a photo and a light emission characteristics graph of the perovskite nanoparticle dispersions prepared based on the samples X1 to X3.

Referring to FIGS. 4A and 4B, it is identified that a peak of a light emission wavelength is redshifted as the flow rate of the dispersion fluid is increased from 80 μl/hr to 200 μl/hr to increase the magnitude of the characteristic region of the liquid crystal, and thus, to increase the size of the nanoparticle.

<Experimental Example 3> Particle Size Analysis

To analyze the size of the perovskite nanoparticle prepared with the method for preparing the perovskite nanoparticle using the fluidic channel according to an embodiment of the inventive concept, nanoparticles present in the samples X2 to X3 of Example 1 were observed with a scanning electron microscope, and a result thereof is shown in FIG. 5.

FIG. 5 is an image obtained by observing a size of a perovskite nanoparticle according to an embodiment of the inventive concept.

Figure 5A:
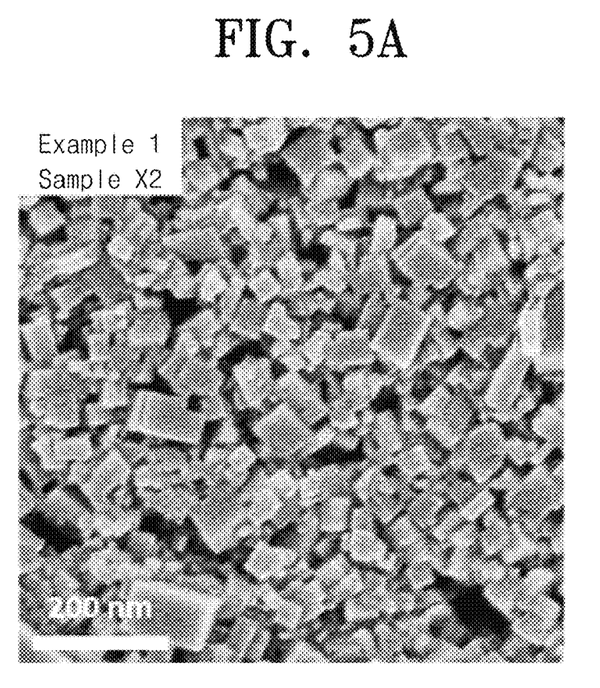
FIG. 5A is a SEM image of a perovskite nanoparticle in the sample X2 in Example 1.
Figure 5B:
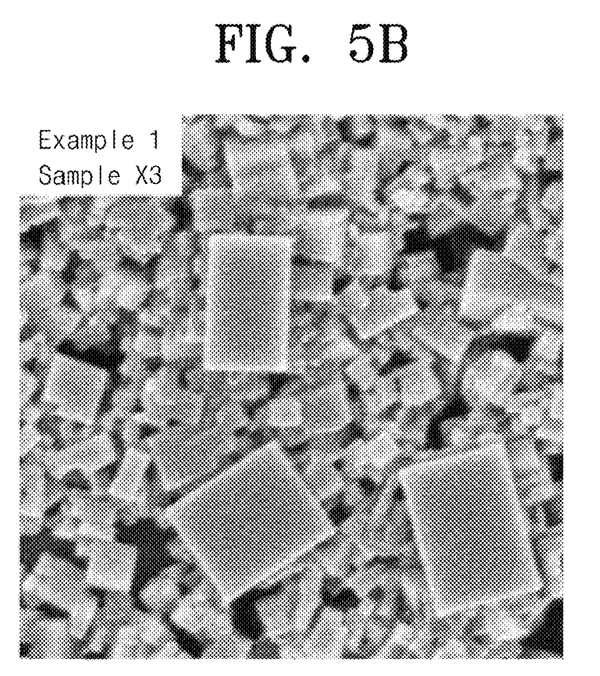
FIG. 5B is a SEM image of a perovskite nanoparticle in the sample X3 in Example 1.

FIG. 5A is a SEM image of a perovskite nanoparticle in the sample X2 in Example 1, and FIG. 5B is a SEM image of a perovskite nanoparticle in the sample X3 in Example 1.

Referring to FIGS. 5A and 5B, it was observed that a size and morphology of the nanoparticles are changed as the flow rate of the dispersion fluid is increased. Accordingly, it was identified that the size and the morphology of the perovskite nanoparticle is able to be controlled by changing the flow rate of the dispersion fluid.

The above detailed description exemplifies the inventive concept.

In addition, the above-mentioned content is to describe a preferred embodiment of the inventive concept, and the inventive concept is able to be used in various other combinations, modifications, and environments. That is, changes or modifications are possible within the scope of the concept of the invention disclosed herein, the scope equivalent to the written disclosure, and/or within the scope of skill or knowledge in the art. The written embodiment is to describe the best state for implementing the technical idea of the inventive concept, and various changes thereof required in specific application fields and uses of the inventive concept are also possible. Therefore, the above detailed description of the invention is not intended to limit the inventive concept to the disclosed embodiment. The appended claims should also be construed to include other embodiments as well.

The method for preparing the perovskite nanoparticle using the fluidic channel according to an embodiment of the inventive concept may increase the production yield while preventing the excessive nanoparticle growth and aggregation during the growth process of the perovskite nanoparticle.

In addition, the size of the perovskite nanoparticle may be easily adjusted, and the size of the nanoparticle may be precisely controlled within a wide range.

In addition, defects of the nanoparticles may be minimized to exhibit the narrow light emission half-width and the excellent light emission quantum efficiency.

In addition, the perovskite nanoparticles having the narrow particle size distribution may be prepared.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for preparing a perovskite nanoparticle using a fluidic channel including a first outer tube with both sides open, a second outer tube disposed on one side of the first outer tube, and a storage tube disposed on the other side of the first outer tube, the method comprising:
   a first step of forming the fluidic channel including the first outer tube, the second outer tube, and the storage tube capable of introducing flows of fluids;
   a second step of inducing formation of the perovskite nanoparticles by continuously preparing a mixed fluid with a laminar flow based on a flow rate by introducing a flow of a base fluid into the first outer tube, and introducing a flow of a dispersion fluid in the same direction as the flow of the base fluid into the second outer tube; and
   a third step of storing the mixed fluid in the storage tube, stirring the mixed fluid stored in the storage tube, and separating the perovskite nanoparticles from the mixed fluid stored in the storage tube,
   wherein the dispersion fluid contains a perovskite precursor, an organic ligand, and a polar aprotic solvent,
   wherein the base fluid contains a liquid crystal, and
   wherein the second step includes limiting a particle growth of the perovskite nanoparticle by an elastic force of the liquid crystal contained in the base fluid occurring when the perovskite nanoparticle becomes larger than a characteristic region defined by an elastic constant and a surface anchoring coefficient of the base fluid containing the liquid crystal contained in the mixed fluid.

2. The method of claim 1, wherein
the liquid crystal is at least one selected from the group consisting of a nematic liquid crystal, a smectic liquid crystal, a cholesteric liquid crystal, and a lyotropic liquid crystal.

3. The method of claim 2, further comprising:
before the second step,
a step of preparing the dispersion fluid,
wherein the step of preparing the dispersion fluid includes:
preparing a perovskite precursor solution containing a first compound satisfying a following Chemical Formula 1, a second compound satisfying a following Chemical Formula 2, and the polar aprotic solvent; and
mixing the organic ligand with the perovskite precursor solution, $$AX \quad \text{[Chemical Formula 1]}$$

wherein A is $Cs^+$ or an organic cation and X is $Br^-$, $Cl^-$, or $I^-$, $$BX_2 \quad \text{[Chemical Formula 2]}$$

wherein B is $Pb^{2+}$, $Sn^{2+}$, $Bi^{2+}$, $Sb^{2+}$, $Mn^{2+}$, or $Cu^{2+}$ and X is $Br^-$, $Cl^-$, or $I^-$.

4. The method of claim 3, wherein the step of preparing the perovskite precursor solution includes:
mixing the first compound and the second compound with each other in a molar ratio of 1:0.75 to 1.5.

5. The method of claim 4, wherein the organic cation is at least one cation selected from the group consisting of a methylammonium cation, a formamidinium cation, and a phenylethylammonium cation.

6. The method of claim 5, wherein the polar aprotic solvent is at least one selected from the group consisting of dimethylformamide and dimethyl sulfoxide.

7. The method of claim 6, wherein the organic ligand includes $R^1COOH$ and $R^2NH_2$,
wherein the $R^1$ and the $R^2$ are a saturated alkyl group or an unsaturated alkyl group having 6 to 28 carbon atoms, regardless of each other,
wherein the $R^1COOH$ is oleic acid,
wherein the $R^2NH_2$ is oleylamine or octylamine.

8. The method of claim 7, wherein the step of mixing the organic ligand with the perovskite precursor solution includes:
controlling a size of the perovskite nanoparticle by adjusting a crystallization reaction speed based on an amount of $R^2NH_2$ to be mixed.

9. The method of claim 8, wherein the size of the perovskite nanoparticle is controlled by controlling a magnitude of the characteristic region,
wherein the magnitude of the characteristic region is controlled by changing a flow rate of one selected from the base fluid and the dispersion fluid constituting the mixed fluid, or by applying a stimulus of one selected from a temperature, an electric field, and a magnetic field to the mixed fluid.

10. The method of claim 9, wherein the magnitude of the characteristic region is controlled based on a temperature of a phase transition from an aligned state to a disordered state and a molecular mass of the base fluid contained in the mixed fluid.

* * * * *